United States Patent
Greenlee et al.

(10) Patent No.: US 7,418,354 B1
(45) Date of Patent: Aug. 26, 2008

(54) SYSTEM AND METHOD FOR LEAK DETECTION BASED UPON ANALYSIS OF FLOW VECTORS

(75) Inventors: Terrill L. Greenlee, Encinitas, CA (US); Nathan W. Anderson, Encinitas, CA (US); Errol F. Jacob, Vista, CA (US)

(73) Assignee: Invensys Systems Inc., Foxboro, MA (US)

( * ) Notice: Subject to any disclaimer, the term of this patent is extended or adjusted under 35 U.S.C. 154(b) by 401 days.

(21) Appl. No.: 11/089,522

(22) Filed: Mar. 23, 2005

Related U.S. Application Data (60) Provisional application No. 60/555,527, filed on Mar. 23, 2004.

(51) Int. Cl.
*G01M 3/26* (2006.01)
(52) U.S. Cl. ..................... 702/51; 73/40.5 R
(58) Field of Classification Search .. 73/40.5 R–40.5 A, 73/49.1; 702/FOR. 139, 51
See application file for complete search history.

(56) References Cited

U.S. PATENT DOCUMENTS

| | | | | |
|---|---|---|---|---|
| 5,570,430 A | * | 10/1996 | Sheehan et al. | 382/128 |
| 6,076,048 A | * | 6/2000 | Gunther et al. | 702/51 |
| 6,244,100 B1 | | 6/2001 | Hastings et al. | |
| 6,389,881 B1 | * | 5/2002 | Yang et al. | 73/40.5 A |
| 6,625,549 B1 | * | 9/2003 | Nawa et al. | 702/51 |
| 6,668,619 B2 | | 12/2003 | Yang et al. | |
| 6,679,098 B2 | | 1/2004 | Cardinale et al. | |
| 6,810,337 B1 | * | 10/2004 | Ashcraft et al. | 702/51 |
| 6,957,157 B2 | * | 10/2005 | Lander | 702/51 X |
| 6,970,808 B2 | * | 11/2005 | Abhulimen et al. | 702/51 X |
| 2005/0049804 A1 | * | 3/2005 | Ardo et al. | 702/51 |
| 2007/0288200 A1 | * | 12/2007 | Guidi et al. | 702/51 X |

FOREIGN PATENT DOCUMENTS

| | | | | |
|---|---|---|---|---|
| EP | 1 007 931 B1 | | 7/2003 | |
| JP | 58085130 A | * | 5/1983 | 73/40.5 R |
| JP | 58088634 A | * | 5/1983 | 73/40.5 R |
| JP | 58100730 A | * | 6/1983 | 73/40.5 R |
| JP | 58131532 A | * | 8/1983 | 73/40.5 R |
| JP | 58215521 A | * | 12/1983 | 73/40.5 R |
| JP | 58215522 A | * | 12/1983 | 73/40.5 R |
| JP | 62161035 A | * | 7/1987 | 73/49.1 |
| WO | WO 02/01173 A1 | | 1/2002 | |

* cited by examiner

*Primary Examiner*—Thomas P Noland
(74) *Attorney, Agent, or Firm*—Cooley Godward Kronish LLP (57) ABSTRACT

A method for detecting a leak in a fluid-conducting conduit is disclosed herein. The method includes generating a first flow vector variation pattern representative of fluid flow through the conduit under known conditions. The method also includes collecting flow data from flow sensors positioned along the conduit. In addition, a second flow vector variation pattern is generated based upon the flow data. The first flow vector variation pattern and the second flow vector variation pattern are then compared in order to detect whether a leak exists in the conduit.

11 Claims, 11 Drawing Sheets

Temperature variation with time and distance

Flow rate variation with time and feeder length (no leak)

FIG. 4B

Flow rate variation with time and feeder length (1% leak)

SYSTEM AND METHOD FOR LEAK DETECTION BASED UPON ANALYSIS OF FLOW VECTORS

CROSS-REFERENCE TO RELATED APPLICATIONS

This application claims the benefit of U.S. Provisional Application No. 60/555,527, entitled "System And Method For Leak Detection Based Upon Analysis of Flow Vectors", filed Mar. 23, 2004, under 35 U.S.C. §119(e), the entire content of which is hereby incorporated by reference.

FIELD OF THE INVENTION

The present invention relates generally to a method and apparatus for the detection of leaks in fluid-conducting conduits and, more particularly, to a system and method of detecting and locating leaks within such conduits by comparing flow vector variation patterns characterizing conduit fluid flow under normal conditions and in the presence of leaks.

BACKGROUND OF THE INVENTION

It is common practice in the utility industry to locate transmission line conductors underground, particularly within urban areas. Typically, such electrical conductors are enclosed within an insulating or "cooling" pipe. The pipe carries a dielectric fluid which functions to cool and insulate the electrical conductors which it surrounds. The dielectric fluid, which is often toxic or otherwise environmentally hazardous, is provided under pressure and may be static or circulate throughout "feeder" networks of the cooling pipes. Sensors are often placed throughout the feeder network to detect the pressure, flow, and level of the dielectric fluid, ground ambient temperature, and current loading of the electrical conductors.

Leaks of the hazardous dielectric fluid can occur within the feeder networks due to corrosion of the cooling pipes, valve leaks, or faulty operation. In order to minimize environmental degradation, it is desirable that actual or imminent leaks of such fluid be quickly detected, located and the feeder network repaired. Although the sensors throughout the feeder network may potentially be utilized in detecting such leaks, it is often relatively difficult to distinguish between sensed conditions indicative of leakage and other operational effects.

SUMMARY OF THE INVENTION

In summary, the present invention relates to a method for detecting a leak in a fluid-conducting conduit. The method includes generating a first flow vector variation pattern representative of fluid flow through the conduit under known conditions. The method also includes collecting flow data from flow sensors positioned along the conduit. In addition, a second flow vector variation pattern is generated based upon the flow data. The first flow vector variation pattern and the second flow vector variation pattern are then compared in order to detect whether a leak exists in the conduit.

In another aspect the present invention pertains to a method for detecting a leak in a fluid-conducting conduit. The method includes generating a baseline flow vector variation pattern. The method further includes collecting flow data from flow sensors positioned along the conduit and averaging the collected data so as to create a set of averaged data. A set of time-varying flow vectors are then generated based upon the set of averaged data. The time-varying flow vectors and the baseline flow vector variation pattern are represented within a coordinate space having indices corresponding to fluid flow within the conduit at the respective positions of corresponding ones of the flow sensors. The method further includes identifying, from the perspective of one of the indices of the coordinate space, a shift between a trace pattern derived from the time-varying flow vectors and the baseline flow vector variation pattern.

In yet another aspect the present invention relates to computer executable code disposed to process flow data collected from sensors positioned along a fluid-conducting conduit in order to detect leakage of fluid from the conduit. The code includes a first code portion for generating a first flow vector variation pattern representative of fluid flow through the conduit under known conditions. A second code portion generates a second flow vector variation pattern based upon the flow data. The code includes a third code portion for comparing the first flow vector variation pattern and the second flow vector variation pattern in order to determine whether a leak exists in the conduit.

The invention may also be characterized as being directed to a method for detecting a leak within a fluid-conducting feeder network disposed to insulate one or more electrical conductors. The method includes developing a model of the feeder network which incorporates a set of simulation equations. A reference flow vector variation pattern indicative of change in fluid flow through the feeder network as a function of change in loading current carried by the one or more electrical conductors during a reference cycle period is then generated using the model of the feeder network. The method further includes collecting flow data from sensors positioned along the feeder network and generating an observed flow vector variation pattern based upon the flow data. The observed flow vector variation pattern is then compared to the reference flow vector variation pattern in order to ascertain the existence of a leak condition.

BRIEF DESCRIPTION OF THE DRAWINGS

For a better understanding of the nature of the features of the invention, reference should be made to the following detailed description taken in conjunction with the accompanying drawings, in which.

DETAILED DESCRIPTION OF THE INVENTION

As is discussed below, the present invention facilitates the detection and location of leaks within fluid-conducting conduits by evaluating flow vectors characterizing the flow of fluid through such conduits. In particular, the time-varying behavior of flow vectors representative of the steady-state or "normal" operation of the feeder network is compared to that of the flow vectors generated in the presence of a leak within the network. A given flow vector will generally be defined by sets of values corresponding to readings from sensors placed throughout a particular conduit of the feeder network. In certain embodiments the flow vectors characterizing normal operation of the feeder network may be derived from a model of the network predicated upon mass and energy conservation. Alternatively, the flow vectors representative of normal network operation may simply be generated on the basis of historical sensor readings averaged over appropriate periods of time.

Figure 1:
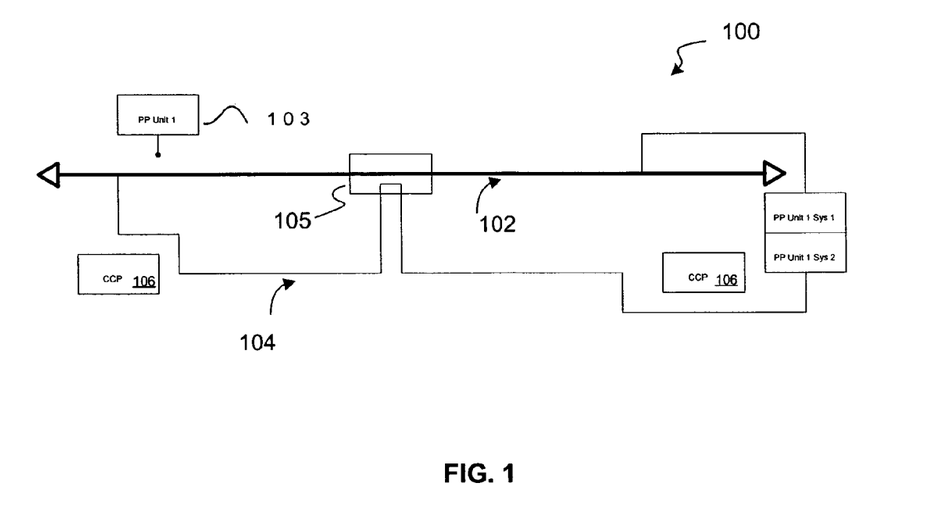
FIG. 1 depicts an exemplary feeder network with respect to which the teachings of the present invention may be utilized to detect and locate fluid leaks.

FIG. 1 depicts an exemplary feeder network 100 with respect to which the teachings of the present invention may be utilized to detect and locate fluid leaks. The feeder network 100 includes a stretch of underground feeder line 102 starting at pumping station 103. The feeder line 102 includes an electrical transmission line cable (not shown) and pressurized dielectric fluid, which is returned to the pumping station 103 through an underground return section 104 of the feeder network 100. As shown, a number of circulation and cooling plant (CCP) structures 106 are located proximate the return line 104. Although in certain embodiments the return line 104 may pass through one or more of the CCP structures 106, for purposes of clarity of presentation the configurable circuit connections between the return line 104 and structures are not explicitly illustrated.

As is mentioned below, in a region 105 it is assumed that a small section of the feeder line 102 is adjacent a steam line or other structure disposed to induce thermal variation along the line. Although certain modeling schemes could interpret the resulting changes in fluid temperature as being indicative of the existence of leaks, it is a feature of the invention that the simulation expressions utilized in the exemplary embodiment effectively compensate for the temperature and other effects which could otherwise mask leaks. In this regard the inclusion of the CCP structures within the system of FIG. 1 is intended to illustrate the types of heat removal processes which may be accommodated by the leak detection methodology of the present invention. It will nonetheless be appreciated that the present invention is equally applicable whether or not the fluid circuit containing the return line 104 passes through components such as the CCP structures 106.

For purposes of the analysis set forth below, it is assumed that the feeder line 102 may be considered as a series of sections. Moreover, it is assumed that within each section the flow condition is well mixed for energy balance. This reduces the flow problem to solving mixed tanks in series for the energy balance. Flow in the feeder 102 is assumed to be laminar, which allows the use of laminar flow pressure drop equations for pressure calculations.

The presence of the electrical cable within the feeder line 102 results in heating of the surrounding dielectric fluid. The degree of such heating will of course vary in accordance with the current loading of the electrical cable. The following exemplary set of parameters are assumed for the analysis of the system 100 given below:

Heat transfer coefficient from the feeder to the ground $(U_g)=1$ W/(m2.s)

Resistivity of copper $(\phi)=1.68e^{-8}$ ohm-m

Cp of fluid $(C_p)=204$ J/(Kg.K)

Specific gravity at 60F (15.56C)=0.87

Dissipation factor (Pf)=0.001

Thermal expansion coefficient $(\alpha)=0.0005$ $K^{-1}$

Cable diameter (2r)=1 inch

Feeder diameter (2R)=10 inch

Feeder ID=9.5 inch

Kinematic viscosity $(v_{100F})=20$ centistokes at 100F

Kinematic viscosity $(v_{210F})=3.7$ centistokes at 210F

Feeder length=23187 ft

Pressure drop across the feeder=60 psi.

Assuming the feeder line 102 is of annular shape, the pressure drop under the conditions of laminar flow through one of its sections is given by:

$$\langle v_2 \rangle = \frac{(P_0 - P_L)}{8 \mu L} R^2 \left( \frac{1-\kappa^4}{1-\kappa^2} - \frac{1-\kappa^2}{\ln(1-\kappa)} \right) \quad (1)$$

Assuming variation of kinematic viscosity $v$ with temperature is exponential.

$$v = AT^x = \rho\mu \quad (2)$$

The exponent x is calculated as, $$x = \frac{\ln\left(\frac{v_{100F}}{v_{210F}}\right)}{\ln\left(\frac{460+100}{460+210}\right)} = -9.33 \quad (3)$$

Thermal expansion coefficient is defined as:

$$\alpha \equiv \frac{1}{\rho}\left(\frac{\partial \rho}{\partial T}\right)_P, \text{ where } \rho = \text{density.} \quad (4)$$

Assuming density variation with pressure (P) is negligible, this can be integrated to obtain:

$$\rho(T) = \rho(15.56C)e^{-\alpha(T-15.56)} \approx \rho(15.56C)(1-\alpha(T-15.56)) \quad (5)$$

Figure 2:
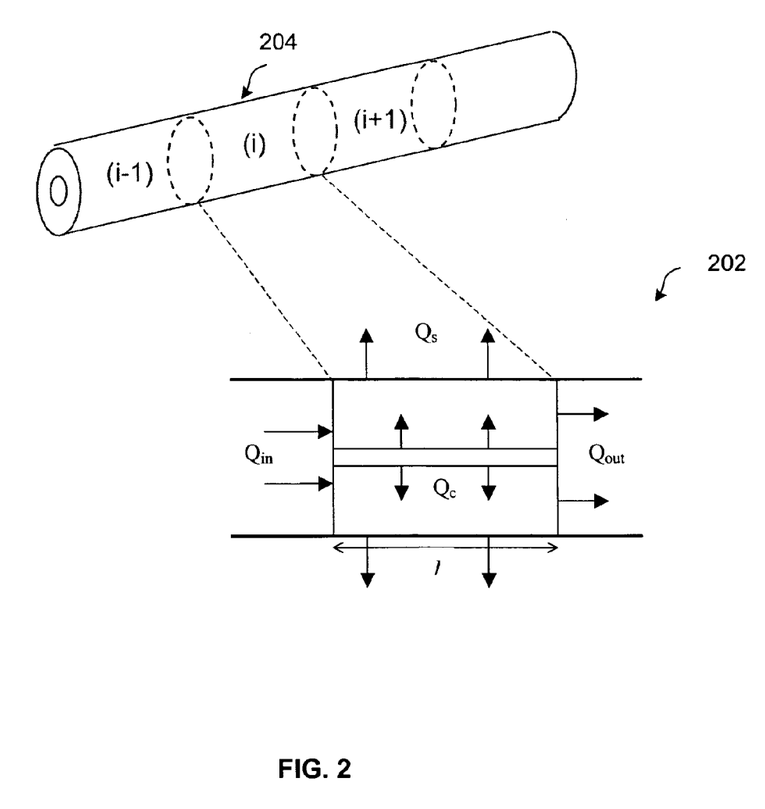
FIG. 2 shows a thermodynamic representation of a single section of a feeder line within the feeder network.

Turning now to FIG. 2, there is shown a thermodynamic representation 202 of a single section 204 of the feeder line 102. The following parameters are relevant to the representation of the feeder section 204 provided by FIG. 2:

$Q_S = U_g 2\pi R l(T_i - T_{amb})$, heat loss to the surrounding environment (6)

$Q_c = Q_{cc} + Q_i$, heat dissipated by the conductor and fluid (7)

$$Q_c = I^2\left(\frac{\varphi l}{\pi r^2}\right) + V \cdot I \cdot Pf, \quad (8)$$

where $I$ = current in the conductor and $V$ = voltage across the conductor.

$Q_{in} = \dot{m}C_p T_{i-1}$, where $\dot{m}$=mass flow rate, $T_{i-1}$=Inlet temperature of fluid (9)

$Q_{out} = \dot{m}C_p T_i$, where $T_i$=Exit temperature of fluid (10)

Heat balancing yields:

$$\frac{d(mC_p T_i)}{dt} = Q_{in} - Q_{out} + Q_c - Q_s \quad (11)$$

where $m=\rho(T_i)V=\rho(T_i)\pi(R^2-3r^2)l$, and where V=Volume of feeder section.

Assuming well-mixed conditions inside each section 204 of the feeder 102 gives:

$$\frac{d(\rho(T_i)VC_p T_i)}{dt} = \dot{m}C_p T_{i-1} - \dot{m}C_p T_i + I^2\left(\frac{\varphi l}{\pi r^2}\right) + V \cdot I \cdot Pf - U_g 2\pi R dx(T_i - T_{amb}) \quad (12)$$

Substituting in (5) in (12) results in:

$$VC_p \rho_{15.56C} \frac{d((1-\alpha(T_i-15.56))T_i)}{dt} = \dot{m}C_p T_{i-1} - \dot{m}C_p T_i + I^2\left(\frac{\varphi l}{\pi r^2}\right) + V \cdot I \cdot Pf - U_g 2\pi R dx(T_i - T_{amb}) \quad (13)$$

Defining $$e = VC_p \rho_{15.56C},\ b = \dot{m}C_p,\ c = b + U_g 2\pi R dx,\ d = I^2\left(\frac{\varphi l}{\pi r^2}\right) + V \cdot I \cdot Pf$$

and substituting in (13) gives:

$$e\frac{dT_i}{dt}(1 + 15.56\alpha - 2\alpha T_i) = bT_{i-1} - cT_i + d + (c-b)T_{amb} \quad (14)$$

Backward difference approximation for derivative gives:

$$e\frac{T_i(t) - T_i(t-1)}{\Delta t}(1 + 15.56\alpha - 2\alpha T_i) = bT_{i-1}(t) - cT_i(t) + d + (c-b)T_{amb}(t) \quad (15)$$

Rearranging (15) as a quadratic in T.

$$T_i^2(t)\left(-\frac{2\alpha e}{\Delta t}\right) + T_i(t)\left(\frac{e(1 + 15.56\alpha + 2\alpha T_i(t-1))}{\Delta t} + c\right) - \left(bT_{i-1}(t) + d + (c-b)T_{amb}(t) + \frac{e(1 + 15.56\alpha)T_i(t-1)}{\Delta t}\right) = 0 \quad (16)$$

And solving gives:

$$T_i(t) = \frac{-B \pm \sqrt{B^2 - 4AC}}{2A} \text{ where} \quad (17)$$

$$A = \left(-\frac{2\alpha e}{\Delta t}\right),\ B = \left(\frac{e(1 + 15.56\alpha + 2\alpha T_i(t-1))}{\Delta t} + c\right),$$

$$C = -\left(bT_{i-1}(t) + d + (c-b)T_{amb}(t) + \frac{e(1 + 15.56\alpha)T_i(t-1)}{\Delta t}\right)$$

Assuming an initial condition for temperature is available for each segment of the feeder line 102, the above can be sequentially solved to obtain T(t) as a function of distance. In addition, the average velocity at each feeder section is given by, $$<v_z> = \dot{m}/V^*l/\rho(T) \quad (18)$$

Rewriting equation (1) in terms of pressure drop and summing over all sections 204 of the feeder line 102:

$$(P_0 - P_L) = \sum_{\substack{\text{All feeder}\\\text{sections}}} \frac{\langle v_z\rangle 8\ \mu L}{\left(\frac{1-\kappa^4}{1-\kappa^2} - \frac{1-\kappa^2}{\ln(1/\kappa)}\right)R^2} \quad (19)$$

Substituting equation (18) in (19) gives pressure drop as a function of mass flow rate. If it is assumed that the mass flow rate is not the same in all sections of the feeder 102 at a particular instant in time (as would be the case when, for example, a leak exists, a fluid cooling system begins operation, or there exists a variation in heat input from electrical losses and external steam pipes along the line), then the mass balance equation is:

$$V\frac{d\rho_i}{dt} = \dot{m}_{i-1} - \dot{m}_i \quad (21)$$

The energy balance equation (14) is rewritten as:

$$e\frac{dT_i}{dt}(1 + 15.56\alpha - 2\alpha T_i) = b'T_{i-1} - c'T_i + d + (c-b)T_{amb} \quad (22)$$

where $b' = \dot{m}_{i-1}C_p,\ c' = \dot{m}_i C_p + U_g 2\pi R dx$

The pressure drop becomes:

$$(\Delta P_i) = \frac{\langle v_z \rangle_i 8 \mu L}{\left(\frac{1-\kappa^4}{1-\kappa^2} - \frac{1-\kappa^2}{\ln(1/\kappa)}\right) R^2} \quad (23)$$

where $\langle v_z \rangle_i$ = average velocity in the $i^{th}$ section

The above simulation equations are intended to resolve a number of issues believed to be pertinent to facilitating improved leak detection. For example, it will generally be desired to compensate for changes in fluid temperature which may have similar effects as leaks. Accordingly, the above simulation expressions are intended to enable compensation for the various different effects that may hide a leak by accurately characterizing the flows predicted to exist in the feeder line in the absence of leakage. Once such predicted flows have been characterized in terms of flow vectors in the manner discussed below, it is possible to detect leaks through comparison of certain aspects of such predicted flow vectors with flow vectors derived from measurements of actual physical flows.

Figure 3:
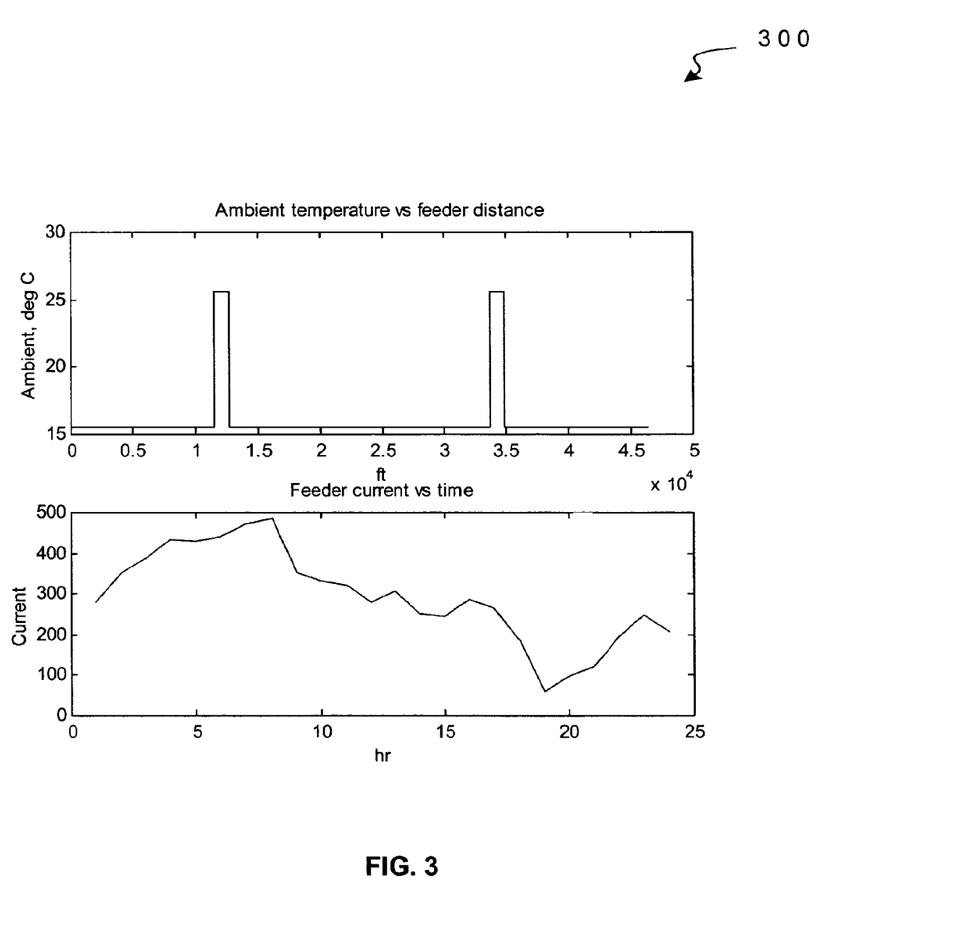
FIG. 3 provides exemplary representations of ambient temperature as a function of distance along the feeder line and of the current loading of the feeder line as a function of time.

Referring now to FIG. 3, exemplary representations 300 are provided of ambient temperature as a function of distance along the feeder line 102 and of the current loading of the feeder line 102 as a function of time. These are assumed to be the ambient and operational conditions applicable to a simulation of the behavior of the line 102 in accordance with the above equations and described below with reference to FIGS. 4A-4C. In this case it is further assumed that a small section of the feeder line 102 (e.g., 5% of its total length) is adjacent a steam line in region 105 (FIG. 1). As is illustrated by FIG. 3, this condition is modeled by setting the ambient temperature at the portion of the feeder line 102 adjacent this steam line to be somewhat higher (i.e., 10C) at this location than elsewhere along the feeder line 102. In FIG. 3, the feeder line 102 extends from 0 ft to 23187 ft. and the return section 104 extends from 23187 ft to 46374 ft.

Figure 4A:
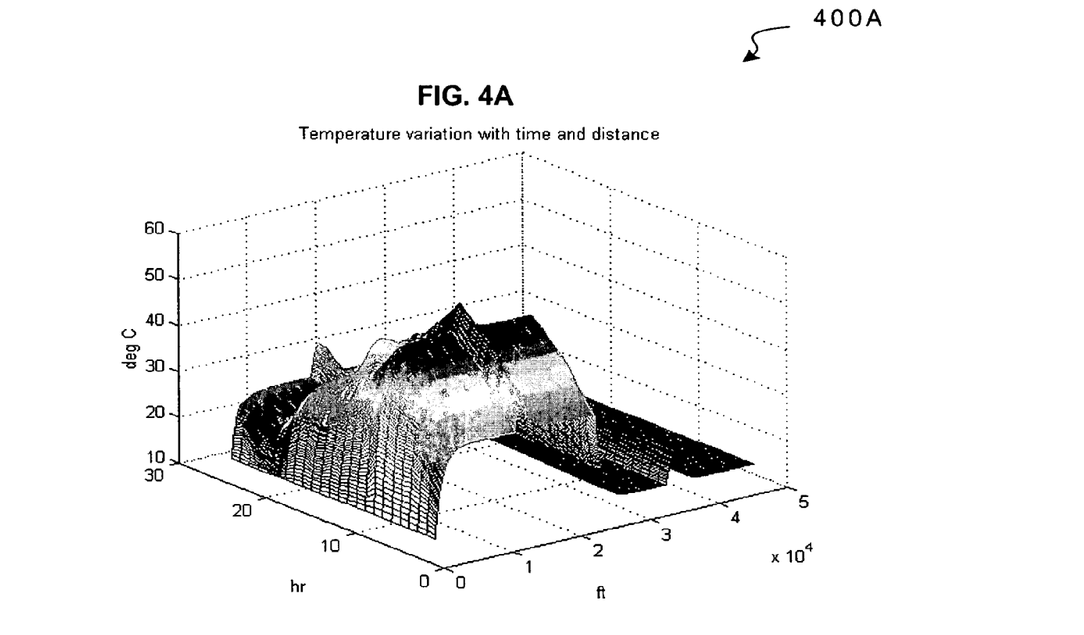
FIGS. 4A-4C provide illustrative representations of the simulated variation in temperature of the feeder line as a function of time and distance for the current loading profile of FIG. 3.
Figure 4B:
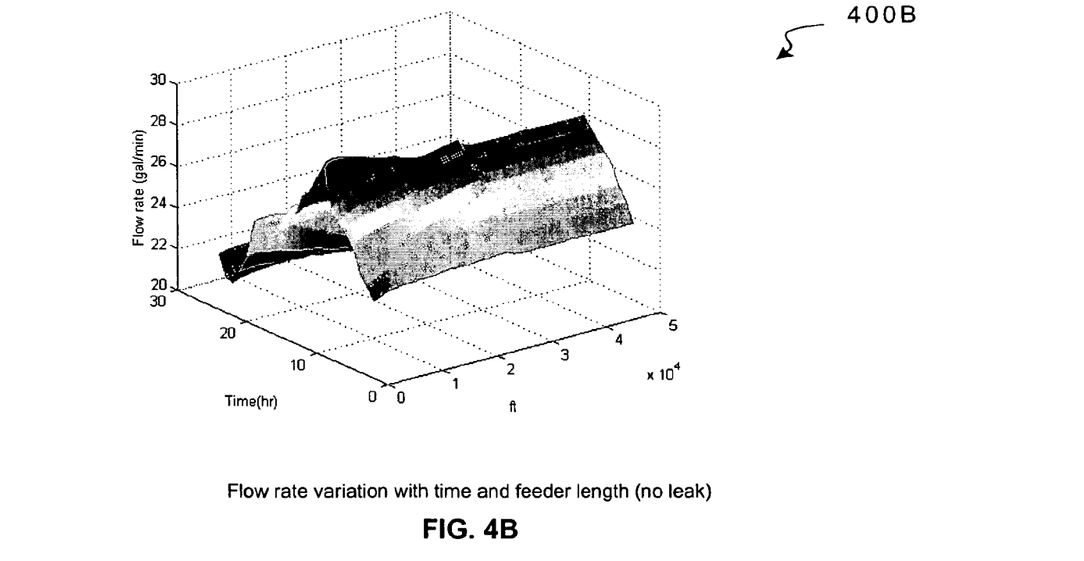
Figure 4C:
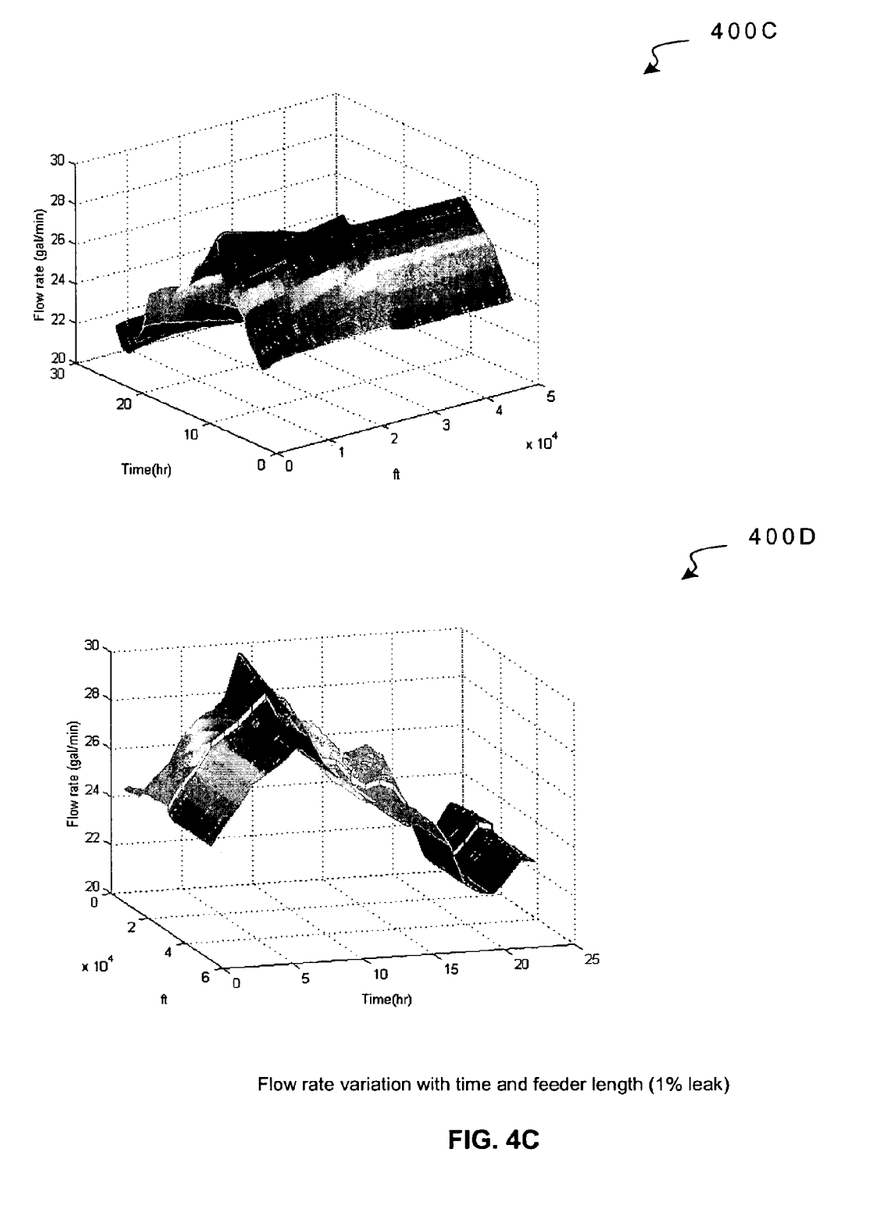

Turning now to FIGS. 4A-4C, illustrative representations 400A-400D are provided of the simulated variation in temperature of the feeder line 102 as a function of time and distance for the current loading profile of FIG. 3. Variation in this current loading contributes to differences in flow velocity within and among the sections of the feeder line 102. As shown, the representation 400A in FIG. 4A and the representation 400B in FIG. 4B are pertinent to the case with no leakage, and the representations 400C-400D in FIG. 4C illustrate the case with a 1% leak. As may be appreciated by the similarity of FIGS. 4B and 4C (respectively representative of the "leak" and "no leak" cases), straightforward monitoring of flow rate as a function of time or distance will generally be insufficient to readily detect leaks. That is, normal variation in flow rates (e.g., due to seasonal variation or operational strategy) may often mask variations arising from leaks.

Figure 5:
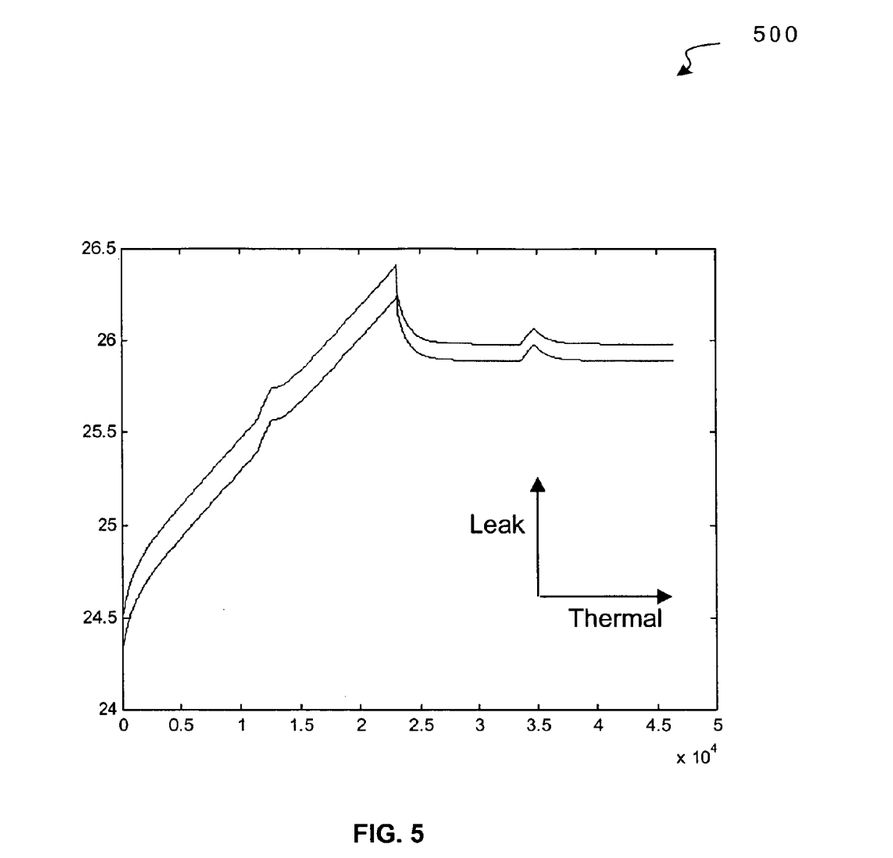
FIG. 5 shows the profile of a simulated velocity of fluid flow along the length of the feeder line for different amounts of leak.

FIG. 5 shows the profile 500 of a simulated velocity of fluid flow along the length of the feeder line 102 for different amounts of leak. A leak is simulated at an unused pumping station by removing either 1% or 10% of the fluid at a simulated leak location of 23187 ft., which also corresponds to the location where the electrical cable exits the feeder line 102. As the percentage of fluid leaked increases, the difference in fluid velocity at the inlet and exit of the feeder line 102 also increases. This leads to a number of possible ways to detect the presence of leaks using velocity measurements. The first possible approach is to compare the flow rate at the exit with a theoretical simulation of flow rate in the absence of a leak condition. A second potential approach is to compare the flow rate at the inlet with the flow rate at the exit. In addition, a third possible approach involves using the integral action of flow rate accumulation as implied by tank level. Although each of these leak detection techniques could be employed in various applications, it has been found that the approach described below tends to be more effective in distinguishing leak conditions from other operational effects.

Figure 6:
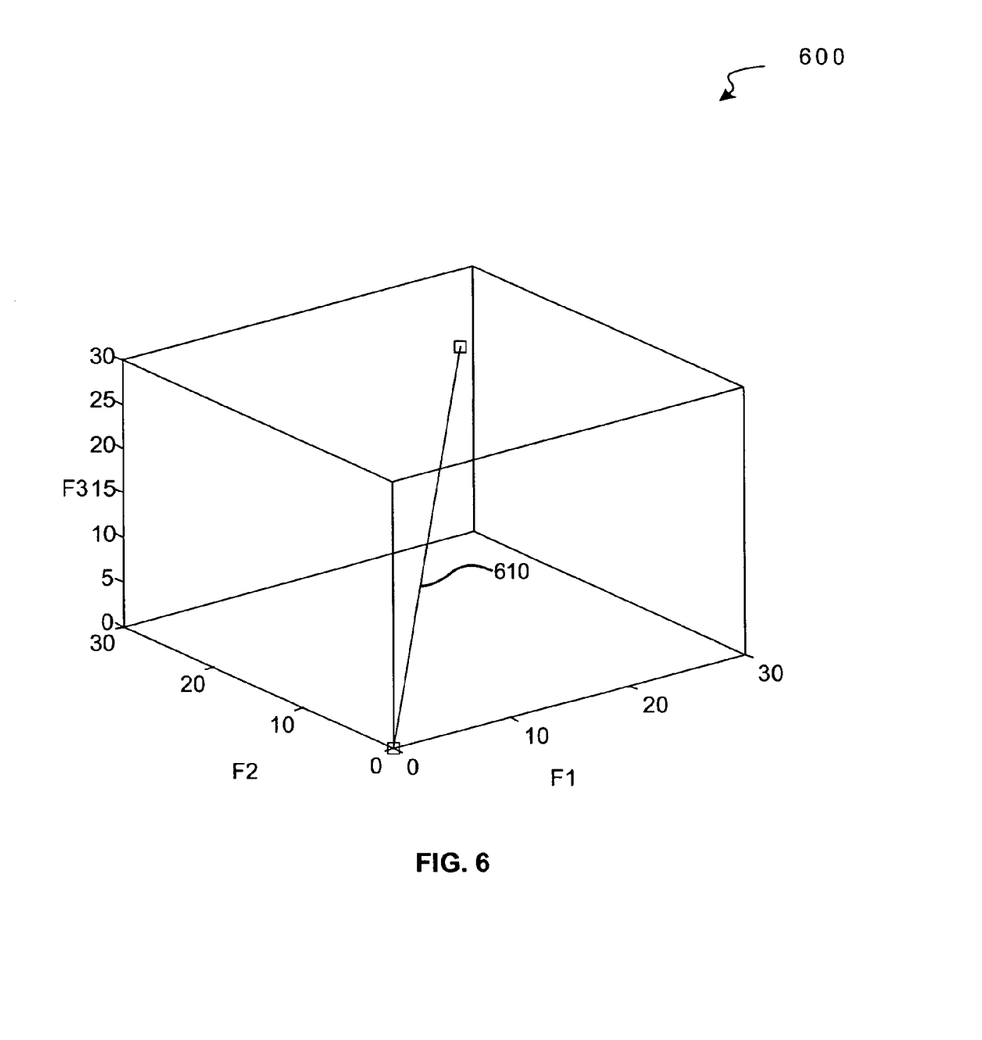
FIG. 6 is a plot of a three-dimensional flow vector in which each of the three perpendicular axes correspond to fluid flow at a particular sensor (i.e., F1, F2, F3) along the feeder line.

FIG. 6 is a plot 600 of a three-dimensional flow vector 610 in which each of the three perpendicular axes correspond to fluid flow at a particular sensor (i.e., F1, F2, F3) along the feeder line 102. In the exemplary embodiment these sensors are located near the input of the feeder 102 (e.g., at 26 ft.), proximate a point at which a leak has been simulated to exist (e.g., at 24000 ft) and at the end of feeder 102 (e.g., at 48000 feet). This is done so as to characterize the spatial pattern of flow in the feeder 102 with a minimum of three values. In accordance with the invention, it has been found that the patterns generated by the changes in such multi-dimensional flow vectors over time will differ in a discernable manner in the case of a leak relative to normal operation.

Figure 7:
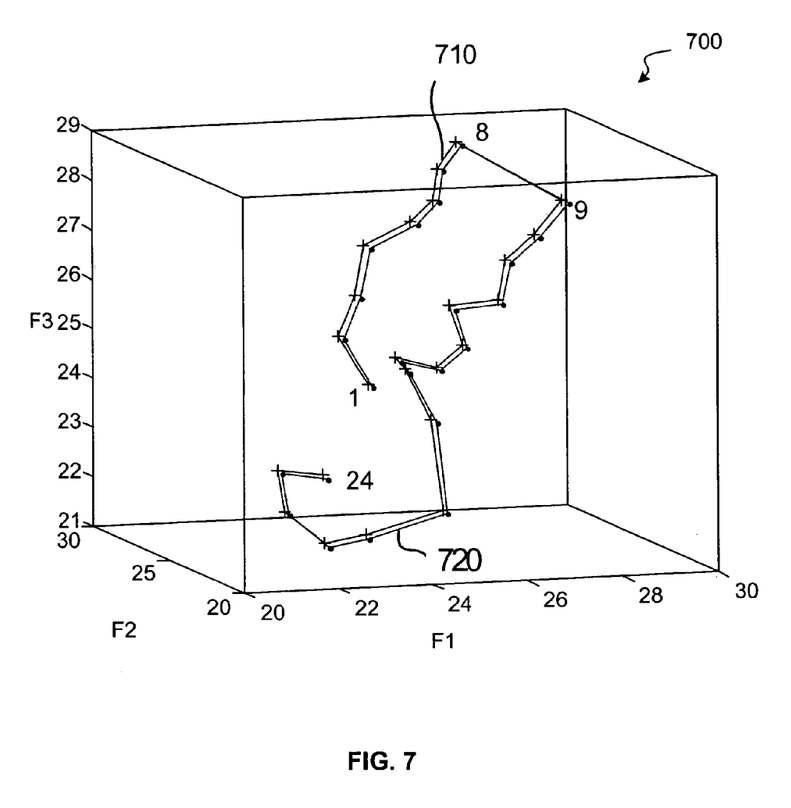
FIG. 7 depicts the pattern traced over time by the tip of the simulated flow vector of FIG. 6 for the case of no leak and a 1% leak (identical current loading being assumed for each case).

FIG. 7 depicts patterns traced over time by the tip of the simulated flow vector of FIG. 6 for the case of no leak and of a 1% leak (identical current loading being assumed for each case). Specifically, the upper pattern 710 corresponds to the case without leakage and the lower pattern 720 represents the case in which a 1% leak exists. In FIG. 7, hourly time stamp annotations are placed proximate the traced patterns 710 and 720, thereby providing an explicit indication of flow vector variation as a function of time. Significantly, the discrimination or classification capability exemplified by FIG. 7 is based upon the recognition that the two patterns 710 and 720 are substantially identical in shape but shifted perpendicularly to each other; that is, the "leak" pattern 720 is translated perpendicularly to the "no-leak" pattern 710.

The shift between the patterns 710 and 720 depicted in FIG. 7 suggests that thermal effects are "orthogonal" to mass transfer or leak effects when observed in a spatial context independent of time. This means that although the shape of the patterns 710 and 720 in FIG. 7 is due to thermal effects, the relative displacement of the patterns 710 and 720 may be attributed to the existence of a leak. As is discussed below, the separation or displacement between the patterns 710 and 720 is even more readily discerned by projecting the three-dimensional representations of FIG. 7 on pairs of its axes; that is, by viewing the patterns of FIG. 7 from the perspective of different ones of its coordinate axes.

Figure 8:
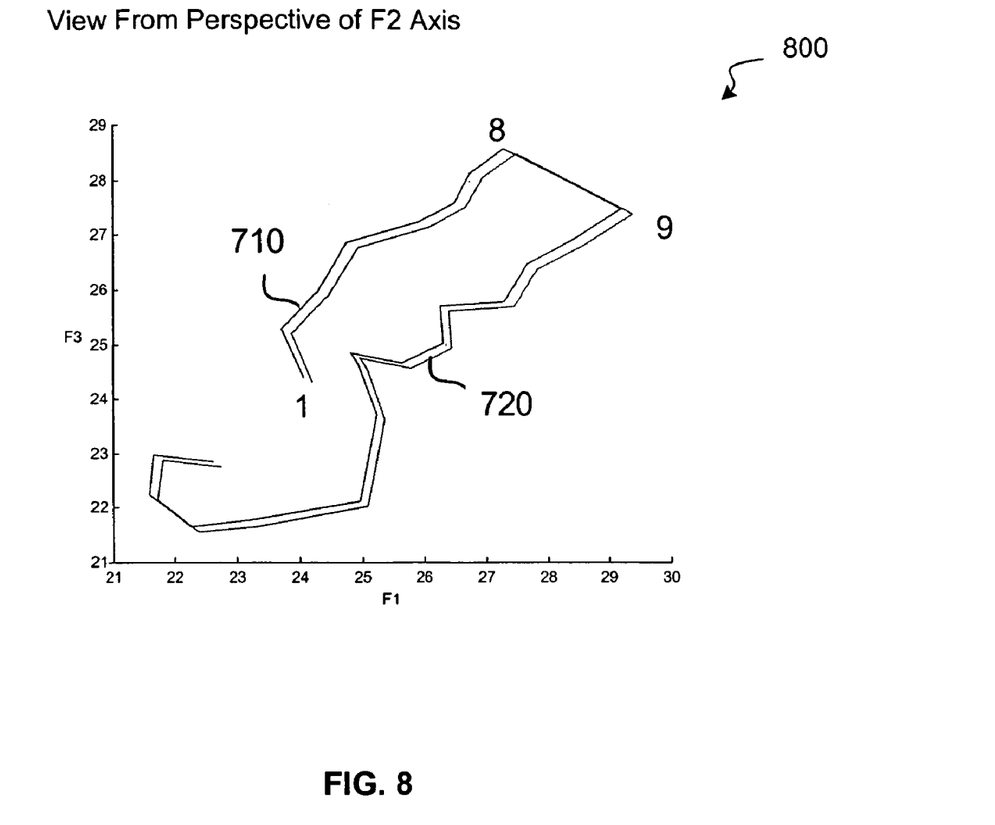
FIG. 8 provides a representation of the projection of the patterns of FIG. 7 upon its F1 and F3 coordinate axes.
Figure 9:
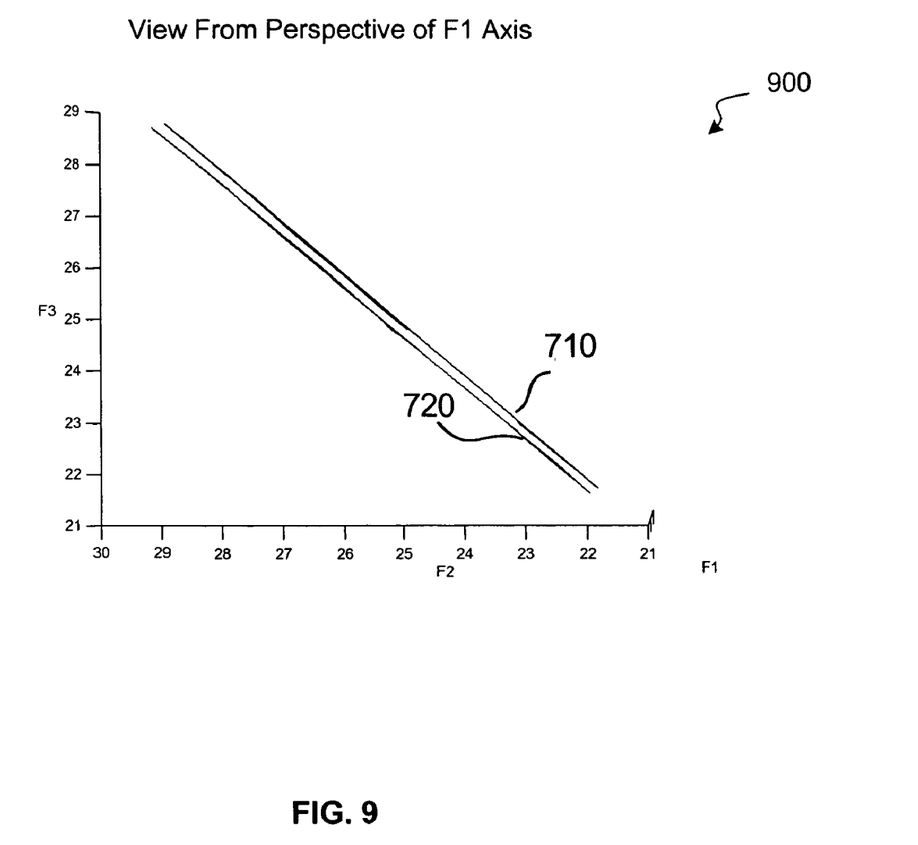
FIG. 9 illustratively represents the patterns of FIG. 7 as viewed from the perspective of the F1 axis.

Turning now to FIG. 8, a representation 800 is provided of the projection of the patterns 710 and 720 upon the F1 and F3 coordinate axes (i.e., the patterns 710 and 720 are viewed from the perspective of the F2 axis). Similarly, FIG. 9 provides a representation 900 of the patterns 710 and 720 as viewed from the perspective of the F1 axis. Shifting the view of the patterns 710 and 720 to the perspective of one of the coordinate axes corresponds to removal of the simulated data produced by the sensor associated with such axis, which effectively projects the patterns 710 and 720 upon the remaining two axes. This observation has implications with respect to the location of leaks along the feeder line 102. In particular, if the patterns 710 and 720 of FIG. 7 appear as completely separated hyperplanes when viewed from the perspective of one of its coordinate axes, then a leak exists between the sensors associated with the remaining two coordinate axes (i.e., the coordinate axes upon which the patterns are projected). Obviously, the visualization of hyperplane separation becomes increasingly difficult as additional sensors are added, since a corresponding additional number of dimensions are required to represent flow vector variation. However, such separation may be detected by a neural network or the like that is trained to recognize "leak" and "no-leak" cases. In this regard it is noted that a neural network, in its simplest form, simply functions as a tool for separating data; that is, it classifies input data points into one or several sets.

The pattern translation described above is believed to be due to the introduction of a leak in a header with a constant pressure differential. This results in the flow upstream of the leak increasing by the same amount as the flow downstream decreases. Although this may be characterized as a manifestation of the principle of conservation of mass, such manifestation is only apparent upon plotting projections of the traces of multi-dimensional flow vectors upon subsets of the coordinate axes used to define such flow vectors in the manner discussed above. Moreover, such plotted flow variation pattern projections provide a means of defining and tracking flow regularity within the feeder line 102. They also may be utilized to generate the points of a reference pattern corresponding to certain a priori conditions, to which a pattern derived from measured sensor data should conform unless a leak is present. The regularity of the reference pattern can be established using and averaging multiple samples from each flow sensor on an hourly basis.

Except as otherwise indicated above, the preceding discussion has assumed that that the patterns representative of flow vector variation over time have been generated based upon data from modeled or "pseudo" data, rather than data actually reported by physical sensors. If the model of the feeder line 102 defined by the above simulation equations accords well with its actual physical implementation, then the data collected by the physical sensors of such implementation would be expected to give rise to very similar patterns (assuming sensor error is minimized through appropriate averaging). If the patterns formed on the basis of actual measurements under controlled conditions differ from those predicted using the simulation equations set forth above, then the model parameters may be appropriately tuned or adjusted in order to minimize the differences between the patterns. This will result in the development of models of desired accuracy, thus providing relatively accurate a priori characterization of the applicable underground feeder network. Once such models have been fully developed, the loading current carried by the electrical conductors insulated by the feeder network is monitored for at least one cycle of its pattern (i.e., 24 hours). This permits a base set of flow vector variation patterns to be simulated on the basis of the monitored loading current. In accordance with the invention, actual data collected by the sensors of a physical implementation of a feeder network is used to create flow vector variation patterns which are compared to the flow vector variation patterns generated on the basis of the above-described simulation equations. This constitutes a unique form of model-referenced absolute classification, which in the exemplary embodiment is useful for detecting and locating leaks within underground fluid-conducting networks.

Figure 10:
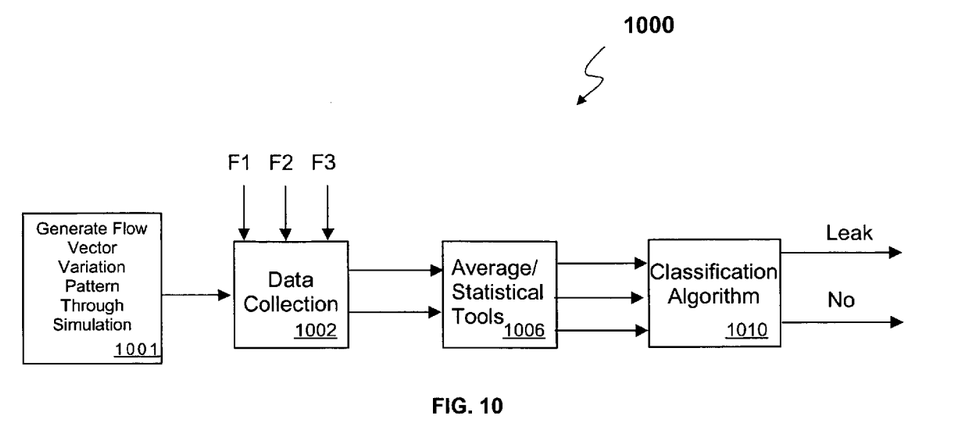
FIG. 10 shows a high-level process flow diagram representative of one embodiment of a leak detection process of the present invention.

Referring now to FIG. 10, there is shown a high-level process flow diagram 1000 representative of one embodiment of a leak detection process of the present invention. In an initial stage 1001, the feeder network to be monitored for leakage is identified and simulated in the manner discussed above. In the exemplary embodiment the simulation is performed with respect to an assumed profile of the current carried by the electrical conductors within the feeder network and a specified ambient temperature. Once values for the other relevant parameters have also been selected, the simulation is run and a plot of a flow vector variation pattern of the type depicted in FIG. 7 is generated.

Once such a flow vector variation pattern has been effectively plotted during a simulation mode, the data collection process of stage 1002 may be initiated. As shown in FIG. 10, during stage 1002 data from physical flow sensors (i.e., sensors F1, F2 and F3) positioned along a feeder line being monitored is collected. The data collected from each sensor is then averaged and used to generate time-varying flow vectors (step 1006). During execution of a classification algorithm, the flow vectors are plotted within the (F1, F2, F3) coordinate space as a function of time and viewed along ones of these coordinate axes relative to the flow vector variation pattern generated during the simulation mode. A leak is deemed to have occurred within the feeder line being monitored upon observation of a shift between the simulated and actual flow vector variation patterns (step 1010).

Figure 11:
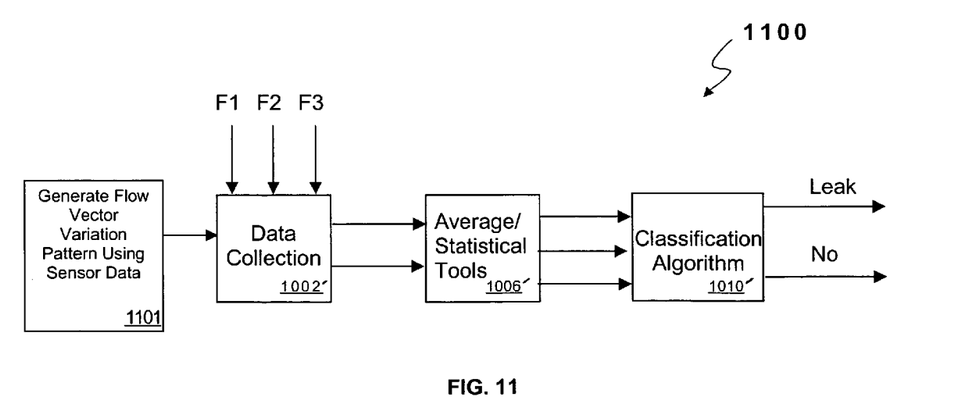
FIG. 11 depicts a high-level process flow diagram representative of an alternate embodiment of a leak detection process of the present invention.

FIG. 11 depicts a high-level process flow diagram 1100 representative of an alternate embodiment of a leak detection process of the present invention. As may be appreciated by comparing FIGS. 10 and 11, processing in the embodiment of FIG. 11 is substantially identical to that performed in FIG. 10 following completion of an initial stage 1101. During this stage 1101, a reference flow vector variation pattern is created using the data collected by the physical sensors monitoring the feeder line during the preceding cycle period (e.g., during the preceding 24 hour period), rather than during a simulation mode. During subsequent execution of the classification algorithm, the reference flow vector variation pattern is used in lieu of a simulated flow vector variation pattern.

It is observed that the simulation equations set forth above are predicated upon the assumption that the cooling fluid flows within the feeder network at a non-zero velocity. As a result of this fluid movement, the inventive leak detection approach disclosed above may be characterized as a solution to a "slow-circulation" leak detection problem. However, in many insulated underground electrical cable systems the cooling fluid does not circulate within the surrounding feeder line, which gives rise to a "static leak" detection problem. In order to accurately reflect the static conditions of this case, the simulation equations set forth above must be predicated upon an assumption of a zero fluid flow velocity. As a consequence, the fluid shrink/swell and corresponding flow patterns will be somewhat different than those illustrated herein but the format of the general solution will be the same in the static and slow-circulation environments. Of course, given the paucity of fluid flow within the static case, in certain embodiments sensors other than the flow sensors may be used to convey information regarding the state of the fluid throughout the feeder network.

The foregoing description, for purposes of explanation, used specific nomenclature to provide a thorough understanding of the invention. However, it will be apparent to one skilled in the art that the specific details are not required in order to practice the invention. In other instances, well-known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the following Claims and their equivalents define the scope of the invention.

What is claimed is:

1. A method for detecting a leak in a fluid-conducting conduit, comprising:
generating a first flow vector variation pattern representative of fluid flow through the conduit under known conditions, wherein the first flow vector variation pattern is derived from a plurality of flow vectors, each of the flow vectors being representative of a simulated state of fluid flow within the conduit at a different point in time;
collecting flow data from flow sensors positioned along the conduit;
generating a second flow vector variation pattern based upon the flow data; and
comparing the first flow vector variation pattern and the second flow vector variation pattern in order to detect whether a leak exists in the conduit.

2. The method of claim 1 wherein the second flow vector variation pattern is derived from a set of flow vectors, each of the flow vectors within the set being representative of a spatial pattern of fluid flow within the conduit at a different point in time.

3. The method of claim 2 wherein a first flow vector within the set of flow vectors is generated based upon portions of the flow data collected from at least three of the flow sensors at a first point in time, and wherein a second flow vector within the set of flow vectors is generated based upon portions of the flow data collected from the at least three of the flow sensors at a second point in time.

4. A method for detecting a leak in a fluid-conducting conduit, comprising:
generating a baseline flow vector variation pattern, wherein the baseline flow vector variation pattern is synthesized from results of a simulation of fluid flow through the fluid-conducting conduit;
collecting flow data from flow sensors positioned along the conduit;
averaging the flow data collected by each sensor so as to create a set of averaged data;
generating a set of time-varying flow vectors based upon the set of averaged data;
representing the time-varying flow vectors and the baseline flow vector variation pattern within a coordinate space having indices corresponding to fluid flow within the conduit at the respective positions of corresponding ones of the flow sensors;
identifying, from the perspective of one of the indices of the coordinate space, a shift between a trace pattern derived from the time-varying flow vectors and the baseline flow vector variation pattern.

5. Computer executable code disposed to process flow data collected from sensors positioned along a fluid-conducting conduit in order to detect leakage of fluid from the conduit, the code comprising code to:
generate a first flow vector variation pattern representative of fluid flow through the conduit under known conditions wherein the first flow vector variation pattern is derived from a plurality of flow vectors, each of the flow vectors being representative of a simulated state of fluid flow within the conduit at a different point in time;
generate a second flow vector variation pattern based upon the flow data; and
compare the first flow vector variation pattern and the second flow vector variation pattern in order to determine whether a leak exists in the conduit.

6. The computer executable code of claim 5 further including code to derive the second flow vector variation pattern from a set of flow vectors, each of the flow vectors within the set being representative of a spatial pattern of fluid flow within the conduit at a different point in time.

7. The computer executable code of claim 6 further including code to generate a first flow vector within the set of flow vectors based upon portions of the flow data collected from at least three of the flow sensors at a first point in time, and to generate a second flow vector within the set of flow vectors based upon portions of the flow data collected from at least three of the flow sensors at a second point in time.

8. The method of claim 7 wherein the comparing includes determining whether a defined degree of separation exists between the observed flow vector variation pattern and the reference flow vector variation pattern within the common plane.

9. The method of claim 8 wherein a leak is deemed to exist between ones of the flow sensors corresponding to the indices of the coordinate space defining the common plan when the defined degree of separation is determined to exist between the observed flow vector variation pattern and the reference flow vector variation pattern.

10. A method for detecting a leak within a fluid-conducting feeder network disposed to insulate one or more electrical conductors, comprising:
developing a model of the feeder network, the model incorporating a set of simulation equations;
generating, using the model of the feeder network, a reference flow vector variation pattern indicative of change in fluid flow through the feeder network as a function of change in loading current carried by the one or more electrical conductors during a reference cycle period;
collecting flow data from sensors positioned along the feeder network;
generating an observed flow vector variation pattern based upon the flow data; and
comparing the observed flow vector variation pattern to the reference flow vector variation pattern.

11. The method of claim 10 wherein the observed flow vector variation pattern and the reference flow vector variation pattern are defined within a coordinate space having indices corresponding to fluid flow within the feeder network at the respective positions of corresponding ones of the flow sensors, the method including projecting the observed flow vector variation pattern and the reference flow vector variation pattern onto a common plane within the coordinate space.

* * * * *